US012381990B2

(12) United States Patent
Lebaschi

(10) Patent No.: US 12,381,990 B2
(45) Date of Patent: Aug. 5, 2025

(54) DOCUMENT READER HAVING AN OPTICAL FILTER WITH VARIABLE LIGHT TRANSMISSION

(71) Applicant: E-Seek, Inc., San Diego, CA (US)

(72) Inventor: Ali Lebaschi, San Diego, CA (US)

(73) Assignee: E-Seek, Inc., San Diego, CA (US)

( * ) Notice: Subject to any disclaimer, the term of this patent is extended or adjusted under 35 U.S.C. 154(b) by 0 days.

(21) Appl. No.: 17/696,617

(22) Filed: Mar. 16, 2022

(65) Prior Publication Data

US 2023/0300270 A1    Sep. 21, 2023

(51) Int. Cl.
*H04N 1/028*    (2006.01)
*H04N 1/00*    (2006.01)

(52) U.S. Cl.
CPC ..... *H04N 1/02895* (2013.01); *H04N 1/00824* (2013.01); *H04N 1/0285* (2013.01); *H04N 1/02865* (2013.01)

(58) Field of Classification Search
CPC ........... H04N 1/02895; H04N 1/00824; H04N 1/0285; H04N 1/02865
USPC ................................ 358/475, 509, 510, 480
See application file for complete search history.

(56) References Cited

U.S. PATENT DOCUMENTS 8,194,292 B2    6/2012    Cook et al.
10,102,583 B2    10/2018    Strange
11,184,501 B2    11/2021    Iiyama
2004/0090529 A1*    5/2004    Takahashi .......... H04N 1/00204
                                                            348/207.99
2009/0168118 A1*    7/2009    Cook .................... H04N 1/1017
                                                            358/488

(Continued)

FOREIGN PATENT DOCUMENTS

EP    2323369 A1    5/2011
EP    2323369 A4    12/2011

(Continued)

OTHER PUBLICATIONS

International Preliminary Report on Patentability for international application No. PCT/EP2023/056659, issued Sep. 10, 2024, 7 pages.

(Continued)

*Primary Examiner* — Chad Dickerson
(74) *Attorney, Agent, or Firm* — Faegre Drinker Biddle & Reath LLP

(57) ABSTRACT

A document reader system configured to capture an image of a document is described. The document reader system includes a document reader having a transparent scan area, a light source, an optical filter, and an image sensor. The transparent scan area is configured to receive the document on a first side of the transparent scan area. The light source is positioned on a second side of the transparent scan area opposite the first side and is configured to emit light towards the transparent scan area. The optical filter is positioned between the light source and the transparent scan area and has a variable light transmission configured to modify light intensity of the light emitted by the light source. The image sensor positioned on the second side of the transparent scan area and configured to capture the image of the document on the first side of the transparent scan area.

13 Claims, 21 Drawing Sheets

(56) References Cited

U.S. PATENT DOCUMENTS

| | | | | |
|---|---|---|---|---|
| 2009/0168124 A1* | 7/2009 | Edwards | ............. | H04N 1/1061 |
| | | | | 358/488 |
| 2011/0228354 A1 | 9/2011 | Fukui et al. | | |
| 2013/0107056 A1 | 5/2013 | Hatzav et al. | | |
| 2017/0078526 A1* | 3/2017 | Hall | .................... | H04N 1/1013 |
| 2021/0014377 A1* | 1/2021 | Iiyama | .............. | H04N 1/00997 |

FOREIGN PATENT DOCUMENTS

| | | | |
|---|---|---|---|
| EP | 3651443 A1 | | 5/2020 |
| EP | 3780571 A1 | | 2/2021 |
| EP | 3780571 A4 | | 5/2021 |
| ES | 1066675 U | * | 11/2007 |
| JP | 2003241327 A | * | 8/2003 |
| WO | WO-2019215211 A1 | * | 11/2019 |

OTHER PUBLICATIONS

Written Opinion and International Search Report for international application No. PCT/EP2023/056659 mailed Jun. 19, 2023, 11 pages.

\* cited by examiner

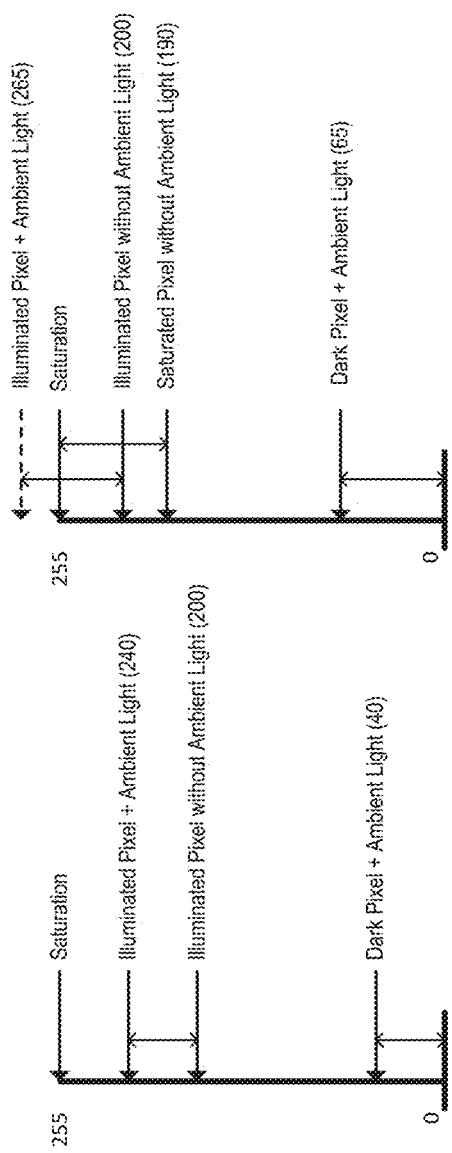

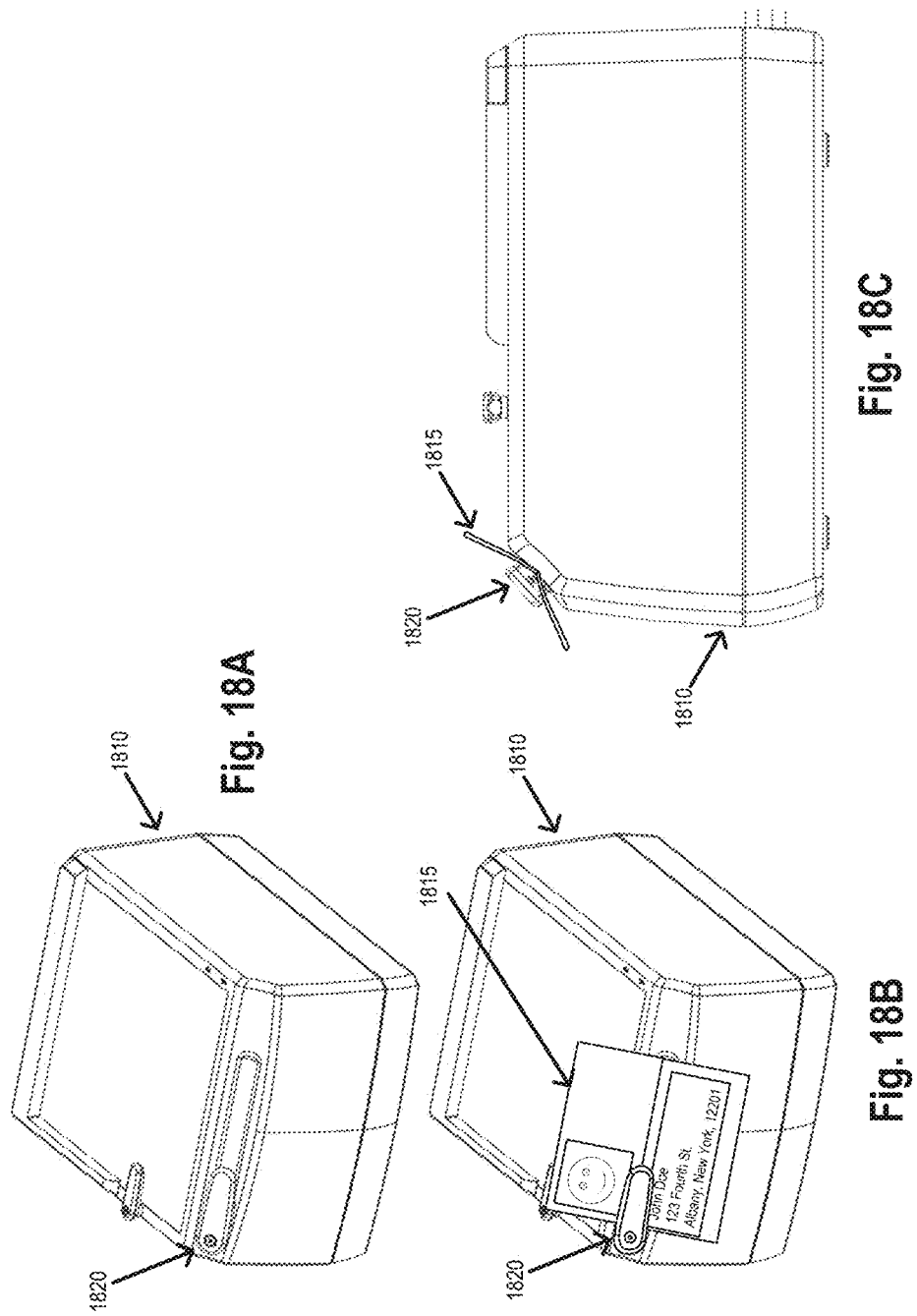

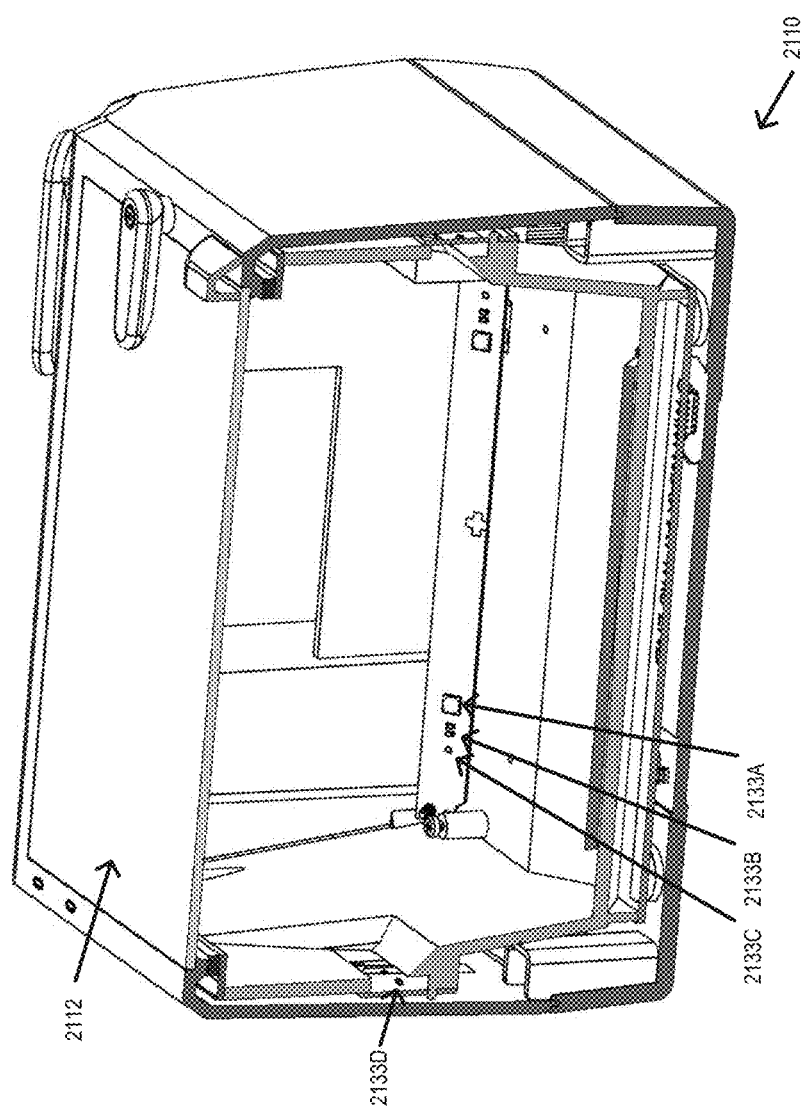

DOCUMENT READER HAVING AN OPTICAL FILTER WITH VARIABLE LIGHT TRANSMISSION

BACKGROUND

Subsequent to recent heightened security, government and private security measures have continued to increase worldwide. Consequently, there is a continued need for business and government security personnel to inspect the identification cards of employees and citizens to verify identity and to ascertain their authenticity and scope. Further, bars, nightclubs and liquor stores that serve alcohol risk hefty tines and loss of their liquor licenses should they serve alcohol or tobacco to underage customers.

There are many versions of travel documents throughout the world issued by various countries for the purpose of identifying nationality of its carrier, often for the purpose of international travel. The common type of document is a passport which is a government issued booklet for its citizens. Typically, passports contain information such as name, nationality, a picture of the carrier, date of birth of the carrier, followed by several pages to be used for visiting countries to apply stamps of entrance or departures.

The standards for issued passports are specified by (ICAO) International Civil Aviation Organization by national governments. The size of passport booklet follows the ISO/ICE 7810 ID3 standard. ICAO also specifies where the readable information must be printed as well as machine readable information such as a test that is suitable for optical character recognition engine. In addition, passports could have embedded contactless chips which also contain personal information and other biometric data of the carrier.

A typical method to read and or verify a passport is via a passport reader. This device is manufactured in varieties of size and shapes. Typically, passport readers employ a glass top surface that is about the size of a passport page. The user opens the passport to the main page which should contain a Machine-Readable Zone (MRZ) or Machine-Readable Passport (MRP), text, and a picture of the carrier. The passport is placed flat on the top of the glass, which is a window to internal image capturing sensors that scan the document. Usually around the glass area, there is an embedded antenna for reading the contactless information from the passport.

The main function of these readers is to scan the informational pages and extract machine readable information from the MRZ. In addition, the information from the MRZ is used to access the embedded contactless chip that contains additional information of the carrier. Finally, using an optical character recognition (OCR) method, the printed information of the images can be converted to text for further validation.

In addition to picture and text information on these documents, the issuer commonly adds another layer of information for security and counterfeit detection purposes. This layer is usually in the form of holographic marks or multicolored ink that can be visible to an operator of the passport reader or other personnel. The operator can view the changes on these marks by tilting the card from side to side or up and down.

Once the document is placed on top of the reader to be scan/read, an assembly of illumination sources, for example light-emitting diodes or LEDs, are turned ON to illuminate the document to be scanned. The illumination assembly may be placed at single side or multiple sides of the document. Therefore, row(s) of an illumination source are placed close to one side of the document, but furthest from an opposite side of the document. This placement may create a nonuniform illumination pattern on the entire document. Generally, capturing an image with nonuniform illumination causes an imager to decrease an exposure time for the image in order to reduce overexpose of a brighter area of the image (e.g., an area adjacent to the illumination source row(s). Next, the captured image is transferred to a connected computer to be processed. This process often flattens the image based on calibration data. Finally, any unwanted marks such as a holograph will be removed. Both operations may be challenging because, without uniform illumination, the dynamic range of the image is reduced. Therefore, flattening the image is limited and removing unwanted marks is not always possible.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to a uniform illumination system for a document reader.

In one embodiment, a document reader system is provided. The document reader system is configured to capture an image of a document and comprises a document reader, a transparent scan area, a light source, an optical filter, and an image sensor. The transparent scan area is configured to receive the document on a first side of the transparent scan area. The light source is positioned on a second side of the transparent scan area opposite the first side and is configured to emit light towards the transparent scan area. The optical filter is positioned between the light source and the transparent scan area and has a variable light transmission configured to modify light intensity of the light emitted by the light source. The image sensor is positioned on the second side of the transparent scan area and configured to capture the image of the document on the first side of the transparent scan area.

In another embodiment, a method for capturing an image of a document is provided. Light is emitted by a light source towards a second side of a transparent scan area, wherein a first side of the transparent scan area opposite the second side is configured to receive the document. The light emitted by the light source is filtered by an optical filter having a variable light transmission to modify light intensity of the light emitted by the light source. The image of the document is captured by an image sensor positioned on the second side of the transparent scan area.

In yet another embodiment, a document reader configured to capture an image of a document is provided. The document reader comprises a transparent scan area configured to receive the document on a first side of the transparent scan area. The document reader further comprises an image sensor positioned on the second side of the transparent scan area and configured to capture the image of the document on the first side of the transparent scan area. The document reader further comprises a plurality of light sources positioned on the second side of the transparent scan area, wherein a first light source is aligned along a width of the scan area and a second light source is aligned along a length of the transparent scan area. The document reader further comprises a mirror arrangement configured to reflect a field of view of the transparent scan area towards the image sensor.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 12A shows a diagram of an example ambient light correction without saturation, according to an example embodiment.

FIG. 17B shows a diagram of an example ambient light correction with saturation, according to an example embodiment.

FIG. 18A, FIG. 18B, and FIG. 18C show diagrams of an example document clip of a document reader, according to an embodiment.

FIG. 19A, FIG. 19B, FIG. 19C, FIG. 19D, and FIG. 19E show diagrams of another example document clip of a document reader, according to an embodiment.

Figure 20A:
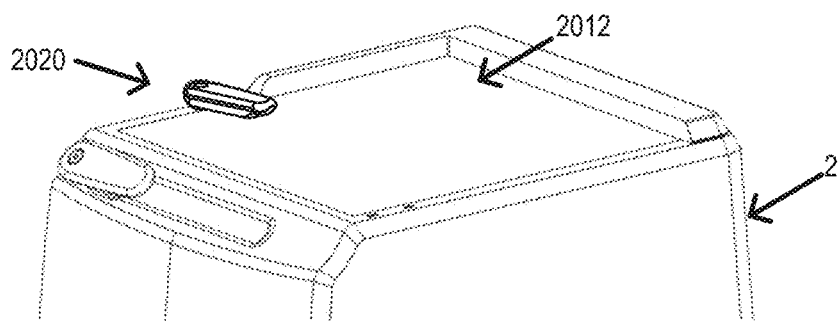
Figure 20B:
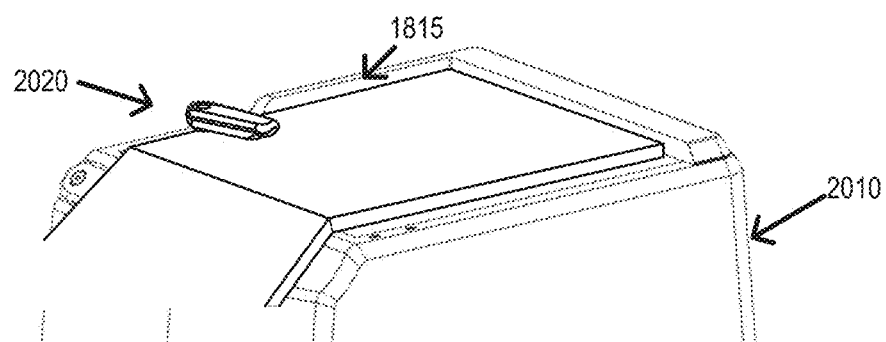
Figure 20C:
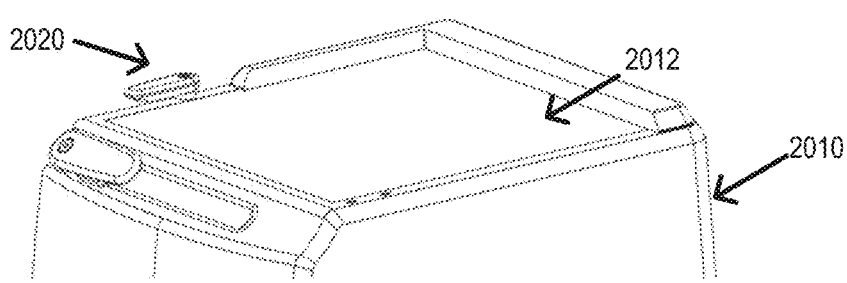

FIG. 20A, FIG. 20B, and FIG. 20C show diagrams of another example document clip of a document reader, according to an embodiment.

FIG. 21 shows a perspective cross-sectional diagram of an example document reader having a plurality of light sources, according to an embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Some examples and embodiments described below provide a document reader that does not require the use of a hood (such as hood 1311, FIG. 13), in other words, a hoodless document reader. In some examples, a hoodless document reader is implemented by incorporating a Graduated Neutral Density (GND) filter into the document reader. Generally, the GND filter balances or smooths out light that is incident on a page of a document. In some examples, the GND filter is positioned in front of a light source, such as one or more light emitting diodes (LEDs) and provides a more balanced illumination of the document for greater dynamic range when capturing images of a page within the document. The GND filter acts as a window in which light from the light source that passes through the window is balanced to have a same intensity level (e.g., an output level for the GND filter) when the light arrives at the document to be illuminated. Generally, the GND filter is configured with a density pattern that matches an illumination pattern projected by the light source.

In various embodiments and/or scenarios, the document reader described herein may provide one or more of balanced illumination, greater dynamic range, higher signal to noise ratio, simplified processing when flattening a captured image, and simplified processing for removing unwanted marks. Moreover, the GND filter may be applied to red/green/blue (RGB) light sources, ultraviolet (UV) light sources, and/or infrared (IR) light sources. Additionally, the GND filter may be installed in a document reader regardless of which side the document is placed.

Figure 1:
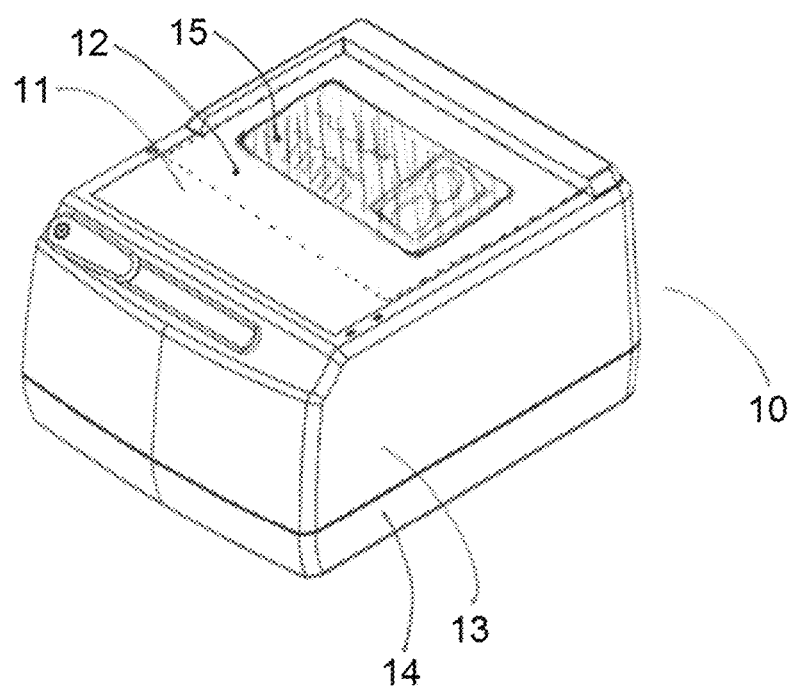
FIG. 1 shows a diagram of an example document reader, according to an example embodiment.
Figure 3:
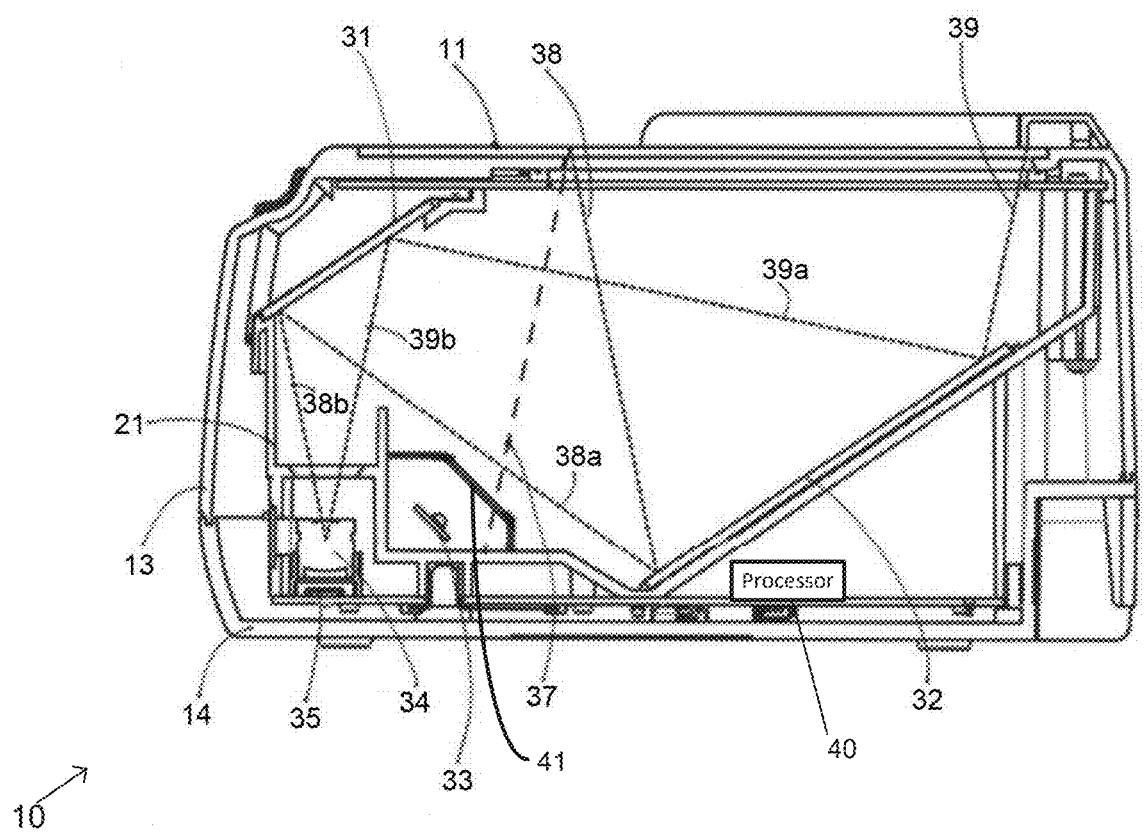
FIG. 3 shows a diagram of an example cross-sectional view of the document reader of FIG. 1, according to an example embodiment.

This and many further embodiments for a document reader are described herein. For instance, FIG. 1 shows a diagram of an example document reader 10, according to an example embodiment. The document reader 10 may include a top housing cover 13 and bottom housing cover 14. The document reader 10 has a scan surface 11 placed on a top surface of top housing cover 13 and on which a document 15 may be placed to capture an image of one or more pages of the document 15, The document 15 is placed on top of the scan area 12 facing down. An image sensor 35 (FIG. 3)

within the document reader 10 is configured to capture an image from a scan area 12 of the scan surface 11.

Examples of the document 15 may come in a variety of sizes and include government issued identifications, such as a driver's license card, passport card, global entry card, government health card, voter identification card, state or national identification card, or other suitable identification document. In other examples, the document 15 may be a credit card, membership card, employment identification, or other suitable card. In still other examples, the document 15 may have multiple pages (e.g., instead of just a front side and a back side), for example, the document 15 may be a passport book. When the document 15 has multiple pages, the scan area 12 may be configured to scan one page at a time, or two pages at a time (e.g., two pages that face each other within a passport book), in various embodiments. In some examples, the document reader 10 may have a scan area 12 configured to scan several different document types in varying sizes, such as driver's licenses, passport books, employee IDs, etc. In the embodiment shown in FIG. 1, the document 15 is a driver's license.

Figure 2:
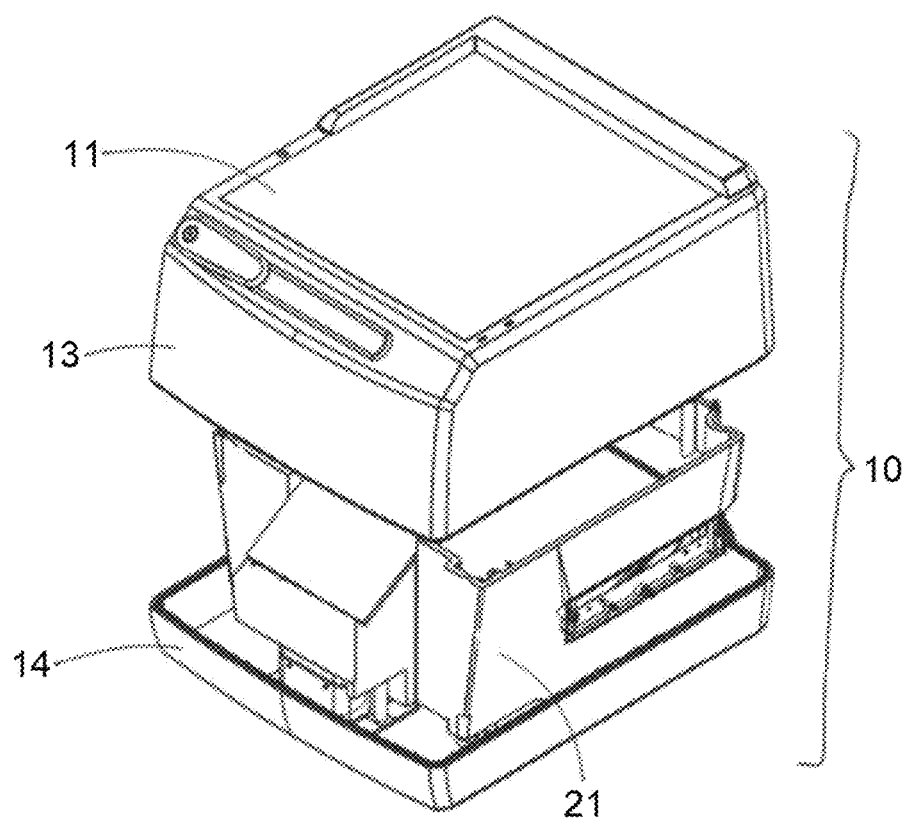
FIG. 2 shows a partially exploded view of the document reader of FIG. 1, according to an example embodiment.

FIG. 2 shows a partially exploded view of the document reader 10 of FIG. 1, according to an example embodiment. The top housing cover 13 and bottom housing cover 14 hold an internal case 21. Generally, the top housing cover 13 and the bottom housing cover 14 are configured to prevent outside elements such as dust, dirt, or unwanted light from entering the internal case 21. In some examples, the top housing cover 13 and the bottom housing cover 14 are configured to be sealed to each other, for example, using a rubber or silicone gasket. The internal case 21 generally covers light or contaminant sensitive components, such as optical components, sensors, lights, processors, etc. and may be further sealed from outside light and only open to the scan area 12. The internal case 21 may be formed using black plastic or other suitably light-absorbent material and optionally painted with a super-black or ultra-black paint to reduce reflections of unwanted light received from the scan area 12.

FIG. 3 shows a diagram of an example cross-sectional view of the document reader 10 of FIG. 1, according to an example embodiment. As shown in FIG. 3, the document reader 10 includes a light source 33, a lens 34 such as a focusing lens, an image sensor 35, a processor 40, and an optical filter 41 within or near the internal case 21. The image sensor 35 is configured to capture images, through the focusing lens 34, of a document placed on the scan surface 11. Examples of the image sensor 35 may include a charge coupled device (CCD), an active pixel sensor, or other suitable image sensor. In some examples, the focusing lens 34 may be omitted, or replaced with one or more other lenses.

In some embodiments, the document reader 10 includes a mirror arrangement configured to reflect light from the scan area 12 (and document 15) towards the image sensor 35 (e.g., into a field of view of the image sensor 35). In this way, light from the scan area 12 and the document 15 is reflected into a field of view of the image sensor 35. In the embodiment shown in FIG. 3, the mirror arrangement includes two mirrors, but may include one, three, four, or more mirrors in other embodiments. In some embodiments, the mirror arrangement also includes one or more lenses, for example, to focus, correct distortion, enlarge, or reduce a size of an image, or provide other suitable optical effects.

Generally, the mirror arrangement allows for a reduced footprint of the document reader 10, Mirror arrangements may assist in folding the field of view of a scan area into a more compact arrangement. Reducing the footprint size of document reader 10 provides the benefit of taking up less space from a workspace or desktop for an agent or person operating the document reader 10. In some examples, the mirrors are a front surface type for efficient reflectivity (e.g., with a reflective surface coated on top of a glass portion, as opposed to a conventional mirror where the reflective coating is behind the glass portion). However, the mirrors may also be conventional mirrors, in other examples. Generally, the mirrors are positioned to reflect images from the document 15 through the focusing lens 34 and onto the image sensor 35.

In the embodiment shown in FIG. 3, light from the scan area 12 is reflected via two mirrors: a first image mirror 31 that is closest to the image sensor 35, and a second image mirror 32 that is in a position to reflect a view of the scan area 12 towards the first image mirror 31. Generally, the first image mirror 31 is positioned in closer proximity to the image sensor 35 along viewing line paths 38 and 39 and is smaller in size than the more distal second image mirror 32, In some examples, the field of view of the image sensor 35 is configured to generally match the scan area 12, for example, based on a size, orientation, shape, and material of the first image mirror 31 and the second image mirror 32. The field of view for the image sensor 35 extends from a left field of view, indicated by viewing line path. 38, to a right field of view, indicated by viewing line path 39, when viewed from the cross section of FIG. 3. The viewing line paths are then reflected by second image mirror 32 into viewing line paths 38*a* and 39*a*, respectively, and continue to be reflected by the first image mirror 31 into viewing line paths 38*b* and 39*b*, respectively.

The light source 33 is configured to illuminate a document (e.g., document 15) that has been placed on the scan area 12. The light source 33 may include one or more LEDs, incandescent bulbs, fluorescent bulbs, or other suitable light sources. Moreover, the light source 33 may be implemented as multiple light sources located in different areas, such as adjacent to the scan area 12, to the right of the second image mirror 32, or in other suitable locations. In one such embodiment, document reader 10 includes multiple instances of the light source 33 that include the light source 33 positioned along a width of document reader 10 (e.g., as shown in FIG. 3), along with at least one additional light source (not shown) positioned along a length or side of document reader 10 and substantially perpendicular to light source 33, such that light sources are positioned on at least two perpendicular sides of scan area 12. In another embodiment, document 10 includes multiple instances of the light source 33 that include a front light source (as shown in FIG. 3) and two side light sources (not shown) that each extend substantially perpendicular to light source 33 on either side of the scan area 12, such that light sources are positioned on at least three sides of scan area 12.

In some embodiments, the light source 33 may be configured to emit light within one or more different wavelengths or emission spectrums, such as one or more of ultraviolet (U V) light, visible light (e.g., white light, red/green/blue or RGB light), and infrared (IR) light. In some examples, the light source 33 is configured to alternately and/or simultaneously emit UV light, RGB light, and IR light under the control of the processor 40. For example, the light source 33 may emit UV light, RGB light, both UV light and RGB light, UV and IR light, RGB, UV, and IR light (e.g., full spectrum light), etc. In some examples, one or more first light sources 33 emit UV light, one or more second light sources 33 emit RGB light, and one or more third light sources 33 emit IR light. Selection of LEDs for the light source 33 may be based on a desired image to be captured. For example: to capture UV-ink based marks (e.g., watermarks) of the document 15, an ultraviolet LED is used to illuminate the UV-ink based marks.

Generally, the light source 33 faces directly towards the scan area 12 and its emitted light covers an entirety of the scan area 12. The positioning of the light source 33 is preferably outside of viewing line path 38 and viewing line path 39 so as to not obstruct an image of the document 15 and to show a real image. For example, if a light source was positioned between viewing line path 38 and line path 39, the light source would be visible in the reflected image on second image mirror 32, thereby creating a very bright, intense and overly-saturated lighting area, potentially obscuring or distorting portions of the reflected image on mirror 32. In addition, the light source 33 is preferably located outside or behind (e.g., to the left, when viewed from the cross-section of FIG. 3) a virtual image mirroring line 37. The virtual image mirroring line 37 is a limit where an object, such as light source 33, would create a virtual image of itself in the field of view of the image sensor 35. The virtual image mirroring line 37 is found by tracing back a real ray (e.g., along viewing line path 38) that emerges from the focusing lens 34. In this case if the light source 33 is placed inside (e.g., to the right of) the virtual image mirroring line 37, then a virtual image of the light source 33 would be shown from the document 15 (e.g., reflected by the document 15 or by glass of the scan area 12). In the embodiment shown in FIG. 3, the light source 33 is placed outside of the virtual image mirroring line 37 to avoid generating a virtual image on an image of the document 15.

The optical filter 41 is configured to filter or attenuate a portion of the light that is emitted from the light source 33. Notably, a substantially same intensity level is provided at the document 15 by filtering the light from the light source 33, even though paths traveled by different rays of light from the light source 33 may have different lengths. In some examples, the optical filter 41 is a graduated neutral density (GND) filter. GND filters, such as the optical filter 41, may have a linear variable light transmission or a non-linear variable light transmission, in various embodiments. In some examples, the variable light transmission of the GND filter corresponds to a filter pattern that is configured to correspond to a beam pattern of the light source 33.

Generally, the optical filter 41 balances, smooths out, or neutralizes the light from the light source 33 before the light reaches the document 15. In some examples, the optical filter 41 is positioned in front of the light source 33 and provides a more balanced illumination of the document for greater dynamic range when capturing images of a page within the document 15. The optical filter 41 acts as a window in which light from the light source 33 that passes through the window is balanced to have a same intensity level (e.g., an output level for the optical filter 41) when the light arrives at the document 15 to be illuminated. Generally, the optical filter 41 is configured with a density pattern that matches an illumination pattern projected by the light source.

In some embodiments, the optical filter 41 is a transparent display, such as a transparent liquid crystal display (LCD) or transparent organic light-emitting diode (OLED), and the light source 33 is a backlight for the transparent display. In these embodiments, the processor 40 may control light transmission levels of individual back light units or pixels of the transparent display to provide a more uniform light intensity level for light emitted by the light source 33 that reaches the scan area 12.

Generally, the processor 40 is configured to control the light source 33 and the image sensor 35. For example, the processor 40 may activate or deactivate the light source 33, control a brightness level of the light source 33, trigger the image sensor 35 to capture an image, etc. In some embodiments, the processor 40 also performs image processing on the captured images, for example, to improve image quality. The processor 40 may be implemented as a specialized image processor, a digital signal processor, a field programmable gate array (FPGA), or other suitable processor that is configured with executable code to provide the features described herein.

Once the document 15 is placed on the scan area 12, the processor 40 may activate the light source 33 and command the image sensor 35 to capture one or more images. In various embodiments, the processor 40 may automatically activate the light source 33 and cause the image sensor 35 to capture the images, for example, upon sensing a change in light level at the image sensor 35 when the document 15 is placed on the scan area 12, upon detecting a proximity of the document 15 using a radio frequency identification circuit within the document 15, or other suitable detection technique. In other examples, the processor 40 causes the image sensor 35 to capture the images in response to a signal from a user interface (not shown) of the document reader 10 or from a host computer linked to the document reader 10.

In some examples, the captured image(s) are processed by the processor 40 of the document reader 10 to obtain a desired image of the document 15. In other examples, the captured image(s) are transferred to a local memory (e.g., within or adjacent to the processor 40) within the document reader 10 and sent to a host computer (not shown). For example, the host computer may perform some, or all of the processing of the captured images to obtain the desired image of the document 15.

Figure 4:
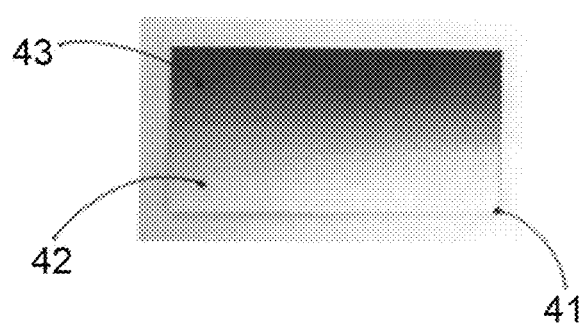
FIG. 4 shows a diagram of an example graduated neutral density filter, according to an example embodiment.

FIG. 4 shows a diagram of an example optical filter 41, according to an example embodiment. The optical filter 41 may be placed in front of the light source 33 of the document reader 10, in various embodiments. The FIG. 4 illustrates a Graduated Neutral Density (GND) filter as the optical filter 41 (referred to herein as GND filter 41). In some examples, the GND filter 41 reduces an intensity of all colors (e.g., wavelengths) of light. In other examples, the GND filter 41 may reduce intensity of specific wavelengths, such as 612 nanometers for red light, 549 nanometers for green light, and 464 nanometers for blue light. In one such example, the light source 33 is formed from three separate LEDs for red light, green light, and blue light and each LED has a corresponding optical filter that reduces intensity of the corresponding light.

The GND filter 41 may be printed on a glass or plastic surface and is transparent or nearly transparent on one proximal side and gradually increases in shading to get darker on the other opposite side. As seen in FIG. 4, a most transparent area 42 (or colorless area) is where the light can transmit most efficiently, and a darkest area 43 (or gray area) is where most of the light is blocked. The purpose of the GND filter is to reduce the intensity of light that varies across the surface of the optical filter 41. Generally, GND filters may be rated according to an optical density of the darkest area 43, or equivalently their f-stop reduction. For example, the GND2 has an optical density of 0.3 at its darkest area 43 with fractional transmittance of 50%, as shown in Table 1 below.

TABLE 1

| Coefficient of the GND filter | Optical Density | Transmittance (%) | F-stop Reduction |
|---|---|---|---|
| GND 2 | 0.3 | %50 | 1 |
| GND 4 | 0.6 | %25 | 2 |
| GND 8 | 0.9 | %12.5 | 3 |
| GND 16 | 1.2 | %6.25 | 4 |

Figure 5:
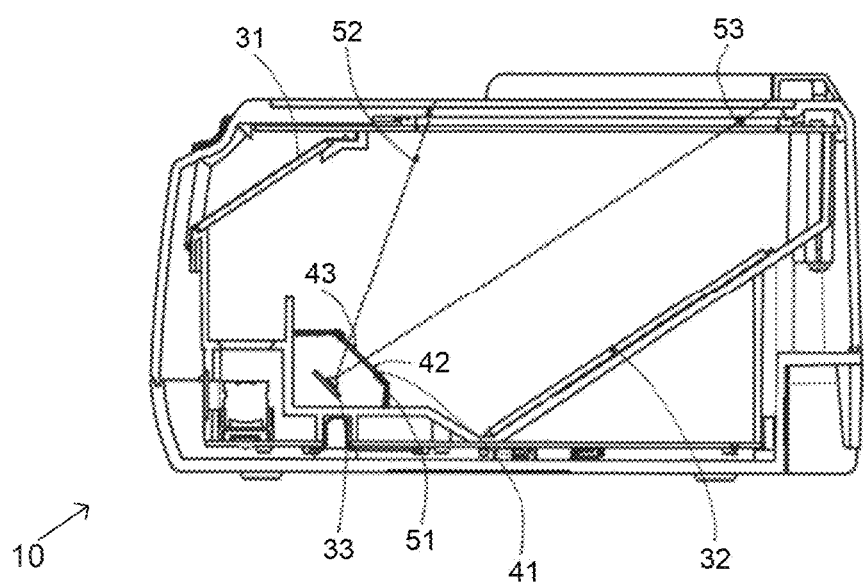
FIG. 5 shows a diagram of an example cross-sectional view of the document reader of FIG. 1 showing virtual illumination lines, according to an example embodiment.

FIG. 5 shows a diagram of an example cross-sectional view of the document reader 10 of FIG. 1 showing virtual illumination lines, according to an example embodiment. As shown in FIG. 5, the light sources 33 are placed into a light cutoff housing 51 to prevent a direct view to first image mirror 31 and second image mirror 32. In other words, the light cutoff housing 51 prevents light emitted from the light source 33 from reaching locations other than the scan area 12. In some embodiments, an angle of the light source 33 relative to the document 15 (or the scan area 12) is configured to provide an optimal portion of light to cover the document 15, for example, by minimizing incoherent irradiance across the document 15 (or across a suitable calibration page) as measured by the image sensor 35. The light cutoff housing 51 may be formed using black plastic or other suitably light-absorbent material and optionally painted with a super-black or ultra-black paint to reduce reflections.

In FIG. 5, a shortest distance 52 (e.g., for a path traveled by light) from the light source 33 to the scan area 12 and a longest distance 53 from the light source 33 to the scan area 12 are shown. The shortest distance 52 to the document 15 generally corresponds to a greater illumination intensity than the longest distance 53, resulting in uneven illumination intensity across the document 15. In other words, the different path lengths, among other factors, create an uncorrected beam pattern that is non-uniform.

Figure 6A:
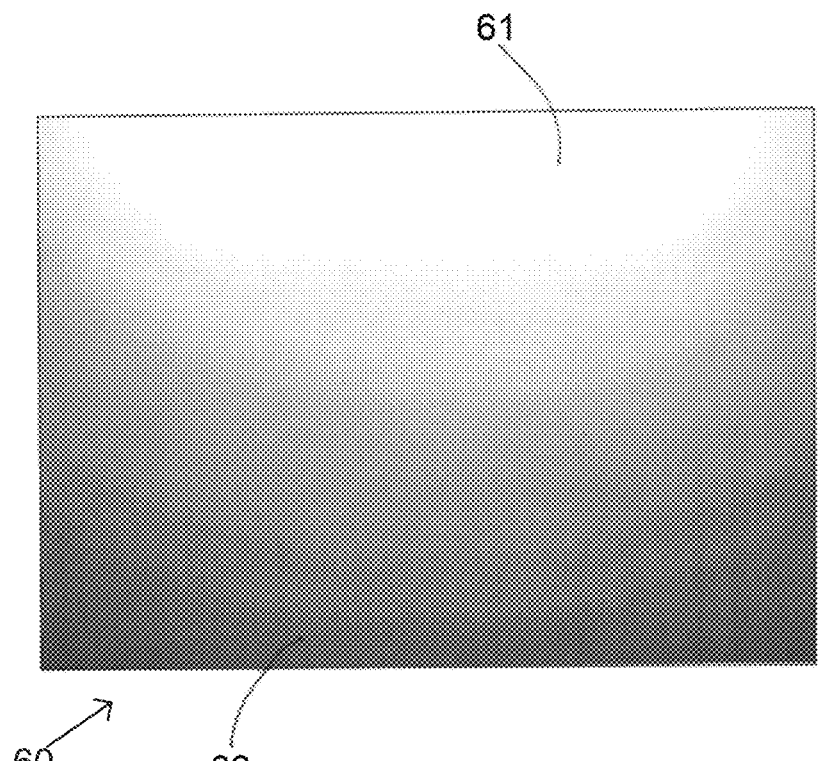
FIG. 6A shows a diagram of an example uncorrected beam pattern, according to an example embodiment.
Figure 6B:
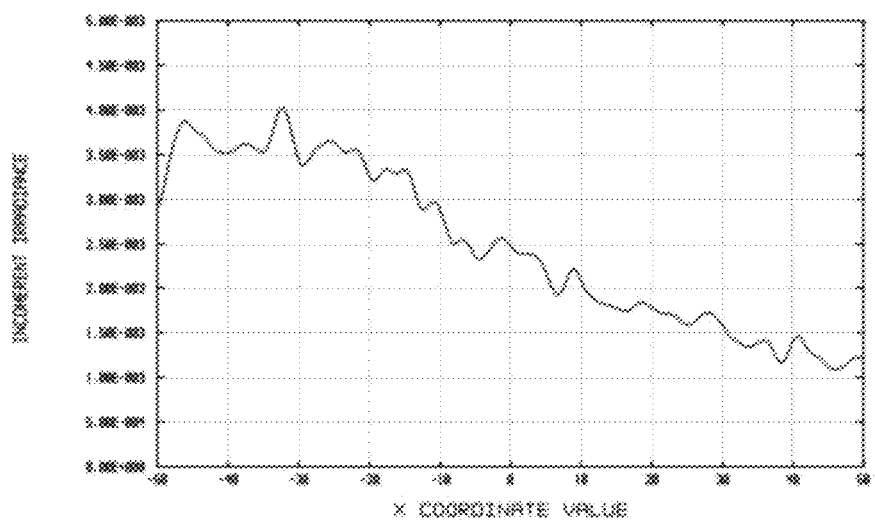
FIG. 6B shows a diagram of an example incoherent irradiance across the uncorrected beam pattern of FIG. 6A, according to an example embodiment.

FIG. 6A shows a diagram of an example uncorrected beam pattern 60 from the light source 33. FIG. 6B shows a diagram of an example incoherent irradiance across the uncorrected beam pattern of FIG. 6A, according to an example embodiment. The uncorrected beam pattern 60 generally is captured using art all-white sheet of paper (or other suitable calibration page) to demonstrate unevenness of the illumination. In FIG. 6A, the shortest distance 52 corresponds to a brighter image portion 61 (or "over saturated area") and the longest distance 53 corresponds to a darker image portion 62, for example, due to dispersion of the optical energy over the longer distance 53. In some examples, the uncorrected beam pattern 60 is also affected by a non-uniform light output of the light source 33, which may have one or more sections of hotspots and/or spill.

If uncorrected, differences in illumination non-uniformity would require the image sensor 35 to shorten its exposure time so that the brighter image portion 61 would not be at a maximum saturation of the image sensor 35. Saturation is the depth of color present within the image. If any part of image color value passes the maximum saturation, then the real value of that part is lost in the captured image. By shortening the exposure time, it also makes the darker image portion 62 even darker. A high difference between the brighter image portion 61 and the darker image portion 62 requires a high dynamic range for the image sensor 35 to accurately capture an image. Here, dynamic range is used to describe a ratio of the brightest possible value to the darkest (black) value. As an example, a pixel element in the image sensor 35 may have an 8 bit theoretical dynamic range capable of 255 levels (e.g., $2^8$). This theoretically represents a value for a sensor black level of 0 and brightest possible level of 255.

Referring to FIG. 6A, lowering an exposure time to decrease a light intensity of the brighter image portion 61 to a level 255, then the maximum value of for the darker image portion 62 would only be 200. This reduces the dynamic range from 255 to a lower range which in this example is 200, With a low dynamic range image, re-adjust of the captured image via image processing techniques to have an even brightness may be performed; however, by increasing the signal level it also increases a noise level, A higher dynamic range of the image sensor 35 enables a longer exposure without significantly increasing noise. Therefore, the higher range has a better Signal to Noise Ratio (SNR). The SNR compares the level of a desired signal to the level of background noise. Both SNR and Dynamic range are closely related. Dynamic range measures the ratio between the lightest and darkest area of the image for the purpose of measuring noise level. SNR measures the ratio between an arbitrary light level (which is not necessarily the brightest light) and noise.

Figure 7A:
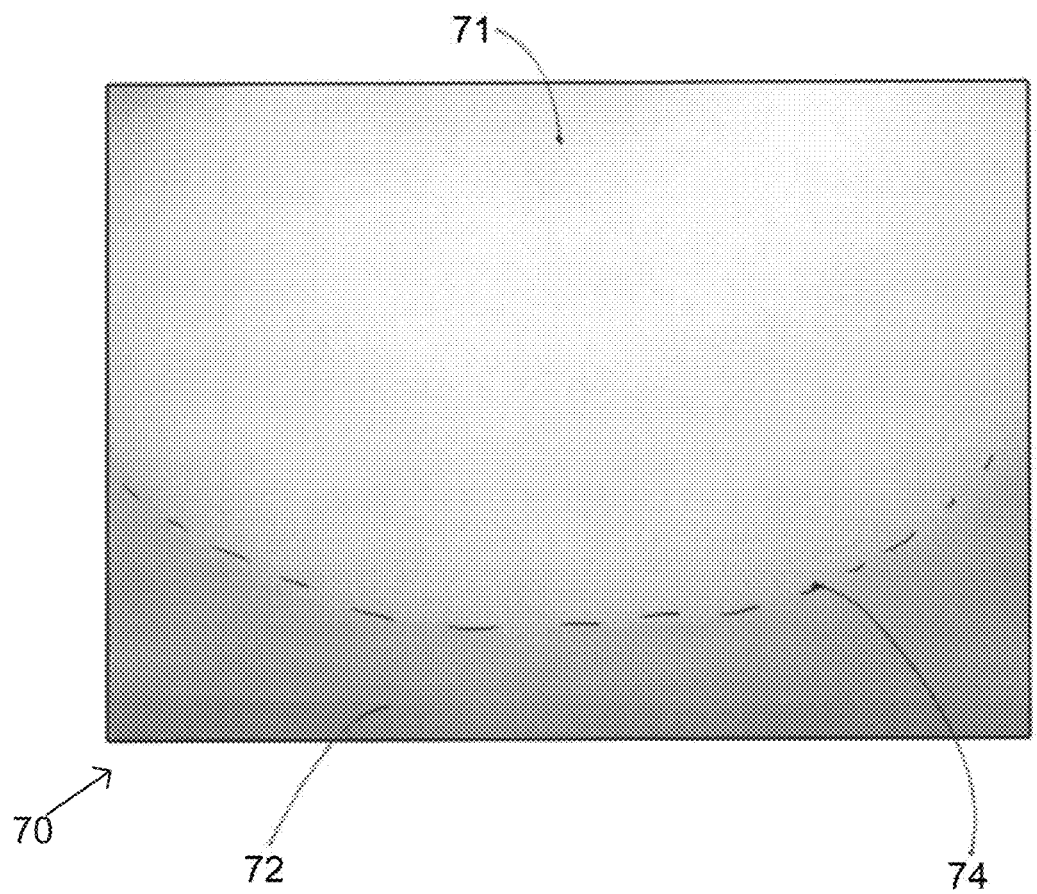
FIG. 7A shows a diagram of an example corrected beam pattern, according to an example embodiment.
Figure 7B:
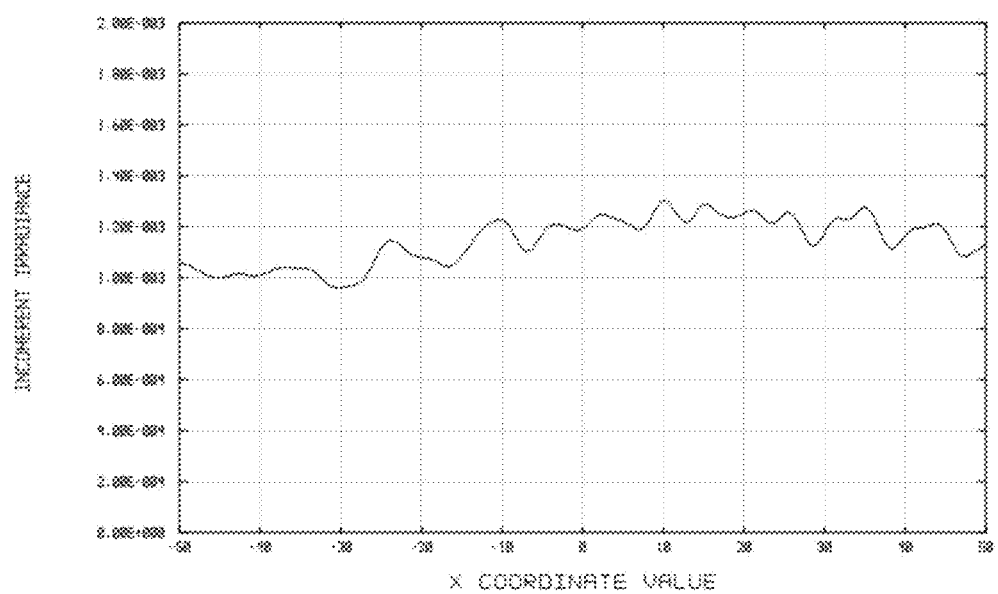
FIG. 7B shows a diagram of an example incoherent irradiance across the corrected beam pattern of FIG. 7A, according to an example embodiment.

FIG. 7A shows a diagram of an example corrected beam pattern 70, according to an example embodiment. FIG. 7B shows a diagram of an example incoherent irradiance across the corrected beam pattern of FIG. 7A, according to an example embodiment. More specifically, the document reader 10 includes the optical filter 41, such as the GND filter, to adjust the brightness of the illumination and provide the corrected beam pattern 70. The optical filter 41 is positioned to have its darkest area 43 covering the shortest distance 52, while the transparent area 42 covers the longest distance 53. Since the shortest distance 52 creates a higher level of illumination, the darkest area 43 of the optical filter 41 lowers the intensity and thus balances or "corrects" the illumination. Moreover, the transparent area 42 of the optical filter provides a higher transmission rate for light travelling along the longest distance 53.

In the corrected beam pattern 70, a brighter image portion 71 and a darker image portion 72 generally correspond to the brighter image portion 61 and the darker image portion 62, but a difference in light intensity between the brighter image portion 71 and the darker image portion 72 is less than that for the uncorrected beam pattern 60. Accordingly, a dynamic range for images using the corrected beam pattern 70 is higher than for the uncorrected beam pattern 60. By increasing the dynamic range, the image sensor 35 is able to make the exposure time longer to capture a more uniform image. This results in an image with a better SNR.

Figure 8:
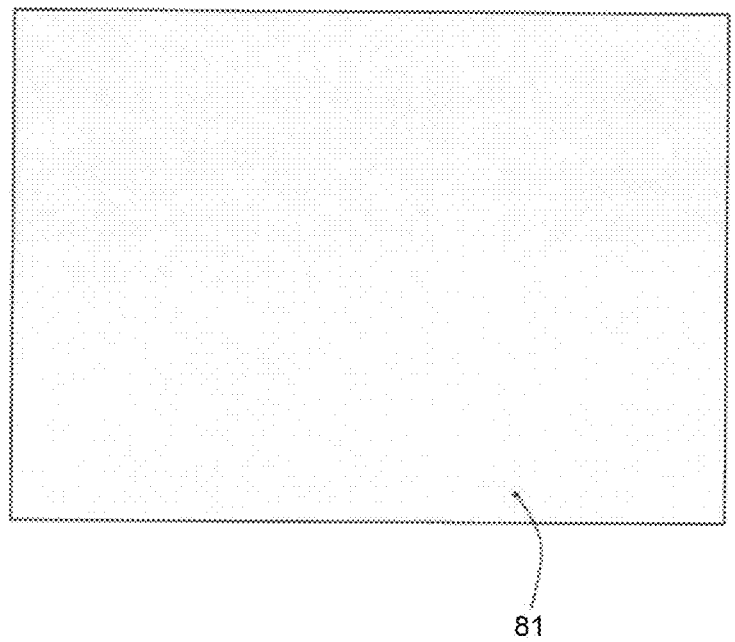
FIG. 8 shows a diagram of an example flattened image for the corrected beam pattern of FIG. 7A, according to an example embodiment.

A direct benefit of an image with high SNR is the ease of flattening the image. This means after making the illumination uniform and capturing the image with best possible SNR, the image still needs to be corrected due to illumination patterns and lens aberration. Illumination patterns exist because each LED illumination pattern is in the form of a circular shape, therefore there are areas of the image where these circular patterns overlap and create the illumination pattern. The lens aberration is a distortion within the lens. Plus, the light travels more efficiently through the center of lens than its corners. This creates an un-even image on the sensor even if the illumination is perfectly uniform. A hotspot transition line 74 corresponds to a transition within an illumination pattern for an image captured by image sensor 35 where light generally transitions from a hotspot illumination to a spill illumination. To remove these patterns, the process is to place a white card as a target to record the unevenness of the image. Then when a final image is captured, based on this calibration data, the image would be corrected. The better performing illumination system with higher SNR, the better flattening process achieved, FIG. 8 shows a diagram of an example flattened image 80 for the corrected beam pattern 70, according to an example embodiment. The flattened image 80 is generated by the processor 40 using conventional image flattening techniques. As shown in FIG. 8, the flattened image 80 has a nearly uniform brightness 81 throughout its entirety, which corresponds to improved image captures for the document 15.

Figure 9:
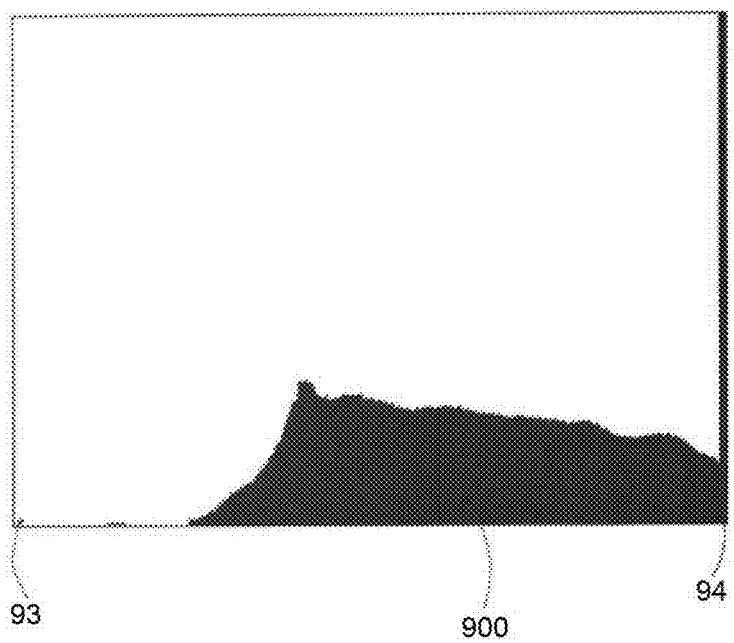
FIG. 9 shows a diagram of an example histogram of the uncorrected beam pattern of FIG. 6A, according to an example embodiment.
Figure 10:
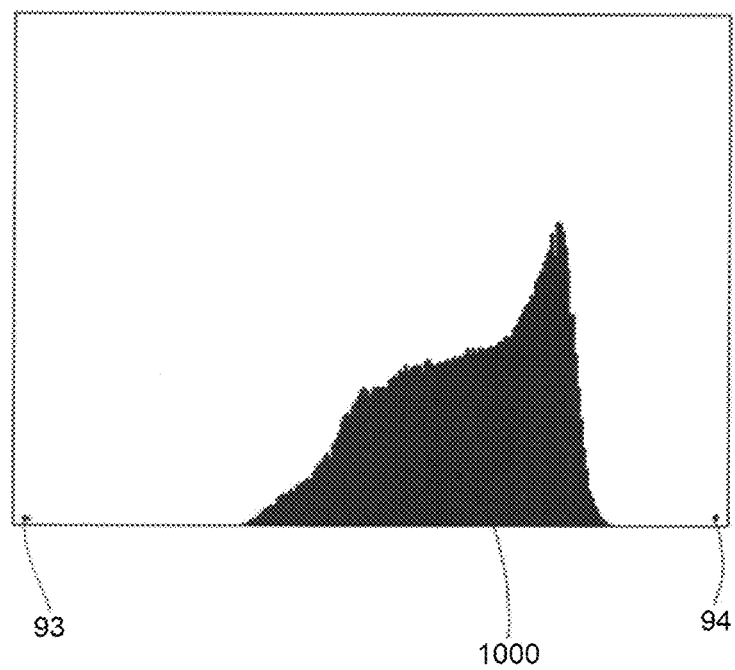
FIG. 10 shows a diagram of an example histogram of the corrected beam pattern of FIG. 7A, according to an example embodiment.
Figure 11:
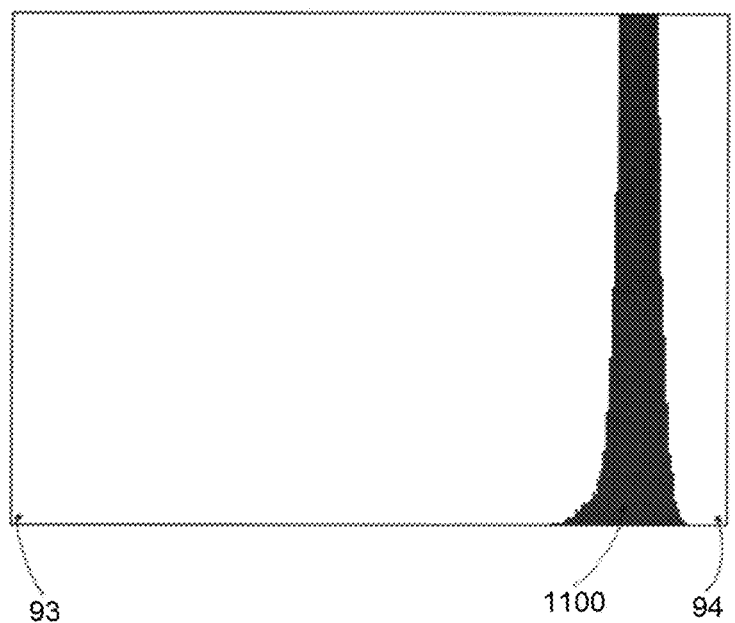
FIG. 11 shows a diagram of an example histogram of a flattened image of FIG. 8, according to an example embodiment.

FIGS. 9, 10, and 11 show diagrams of example histograms 900, 1000, and 1100 corresponding to the uncorrected beam pattern 60, the corrected beam pattern 70, and the flattened image 80, respectively. A histogram is an approximate representation of a distribution of color, where a horizontal axis of the histogram represents tonal variations (e.g., different colors or wavelengths of light), while a vertical axis represents a total number of pixels in a particular tone. Generally, a left side 93 of the horizontal axis represents dark areas, a middle represents mid-tone values, and a right side 94 represents light areas.

The histogram 900 shows a distribution of values that correspond to the brighter image portion 61 and darker image portion 62 of the uncorrected beam pattern 60. The histogram 1000 shows a distribution of values that correspond to the brighter image portion 71 and darker image portion 72 of the corrected beam pattern 70. As shown in FIG. 11, after flattening, the histogram 1100 has a narrower distribution between the left side 93 (darkest) and right side 94 (lightest) as compared to the histogram 900 or histogram 1000.

Figure 12:
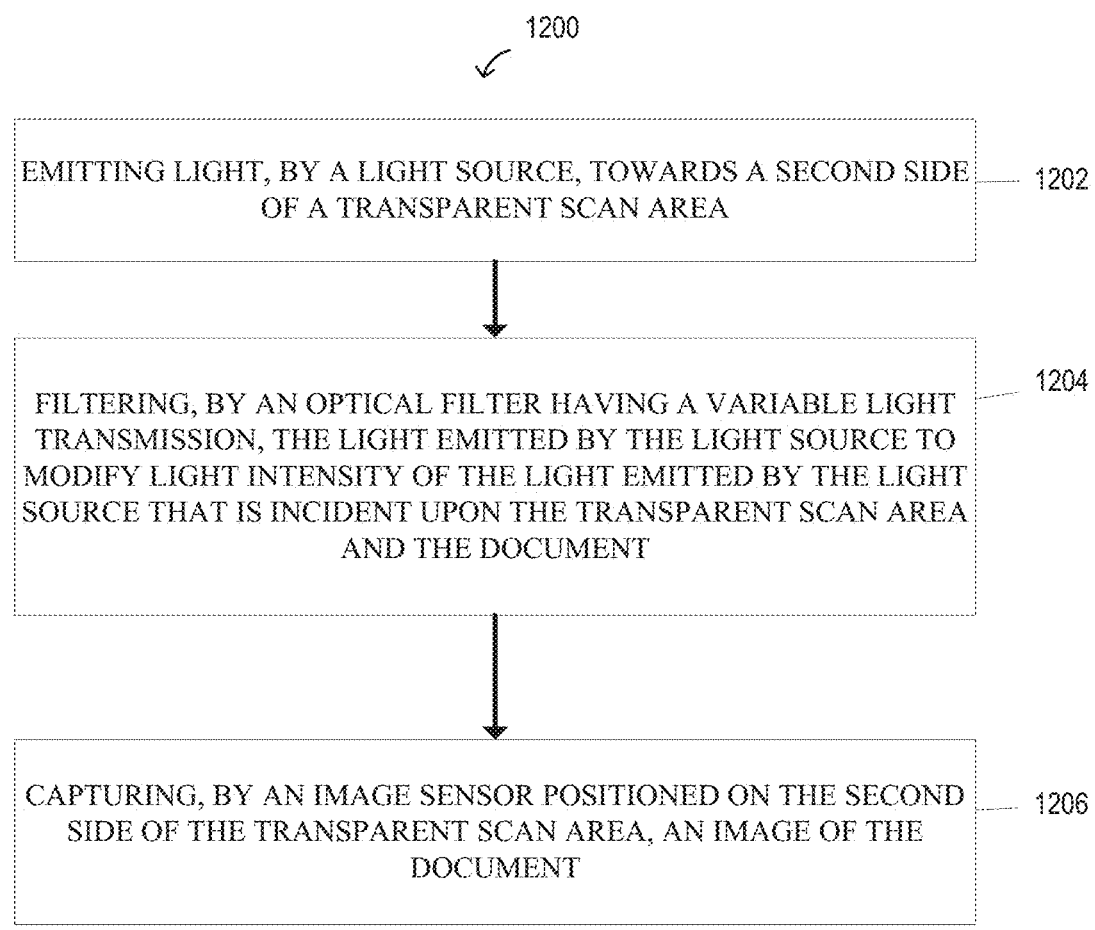
FIG. 12 shows a flowchart of an example method of capturing an image of a document, according to an example embodiment.

FIG. 12 shows a flowchart of an example method 1200 of capturing an image of a document, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 12. Steps may be performed serially, in a partially overlapping manner, or fully in parallel. Thus, the order in which steps of method 1200 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 12 may be performed by the document reader 10 (e.g., via the light source 33, the image sensor 35, the optical filter 41, and/or the processor 40), or other suitable computing device.

Method 1200 begins with step 1202. At step 1202, light is emitted by a light source towards a second side of a transparent scan area. A first side of the transparent scan area opposite the second side is configured to receive the document. The light source and the scan area may correspond to the light source 33 and the scan area 12 of the document reader 10, in some examples.

At step 1204, the light emitted by the light source is filtered by an optical filter having a variable light transmission to modify light intensity of the light emitted by the light source that is incident upon the transparent scan area and the document. In some examples, the optical filter corresponds to the optical filter 41. In some examples, filtering the light may, include filtering the light using a graduated neutral density (GND) filter that neutralizes the light intensity of the light emitted by the light source that is incident upon the transparent scan area. The GND filter may have a variable light transmission that corresponds to a filter pattern that is configured to correspond to a beam pattern of the light source.

At step 1206, the image of the document is captured by an image sensor positioned on the second side of the transparent scan area. In some examples, the image sensor corresponds to the image sensor 35 of the document reader 10.

In some examples, the method 1200 further includes restricting the light emitted by the light source using a light cutoff housing. The light cutoff housing may correspond to the light cutoff housing 51, in some examples.

Hoodless Configuration

Figure 13:
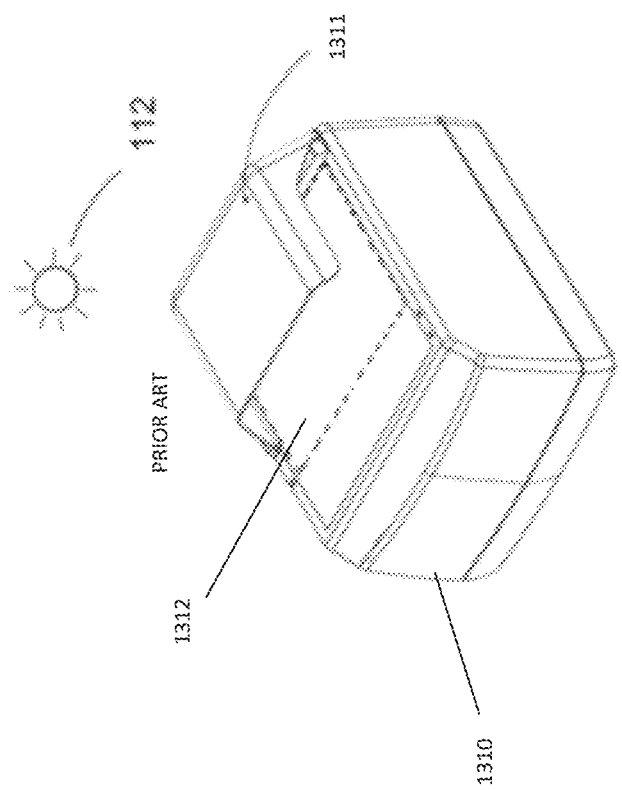
FIG. 13 shows a diagram of a prior art document reader with a hood.

FIG. 13 shows a diagram of a prior art document reader 1310 with a hood 1311. Many document readers are designed to be used with documents of varying shapes (e.g., larger passport booklets and smaller driver's licenses). When a smaller sized document is placed on the scan area of a document reader, an increased level of external ambient light can be present, which may reduce the dynamic range of the document image. Thus, some document readers utilize a hood. The hood 1311 generally shields a scan area 1312 (similar to scan area 12). More specifically, the hood 1311 acts as a cover to prevent or reduce external ambient light 112 from entering the scan area 1312. However, having the hood 1311 prevents a user from directly viewing the scan area 1312 and a placed document. The user could mistakenly forget to remove the document after the scanning process is done. Moreover, the hood 1311 increases physical dimensions (e.g., height) of the document reader 1310, which may limit placement of the document reader 1310 in places like an airport terminal with minimal counter space. In addition, hoods that are hinged or otherwise articulated may also slow processing time for a user to review the document in the scan area, as the user must include the additional steps of opening the hood and closing the hood after placement of the document onto the scan area. Moveable hoods (e.g., hinged hoods) may further increase the physical dimensions of a document reader and decrease working space for a user (e.g., tight work desks or kiosks at an airport).

In some embodiments, the document reader 10 does not have a hood, but is configured to process images captured by the image sensor 35 to compensate for ambient light, such as ambient light 112. In other words, the document reader 10 may be implemented as a hoodless document reader.

Figure 14:
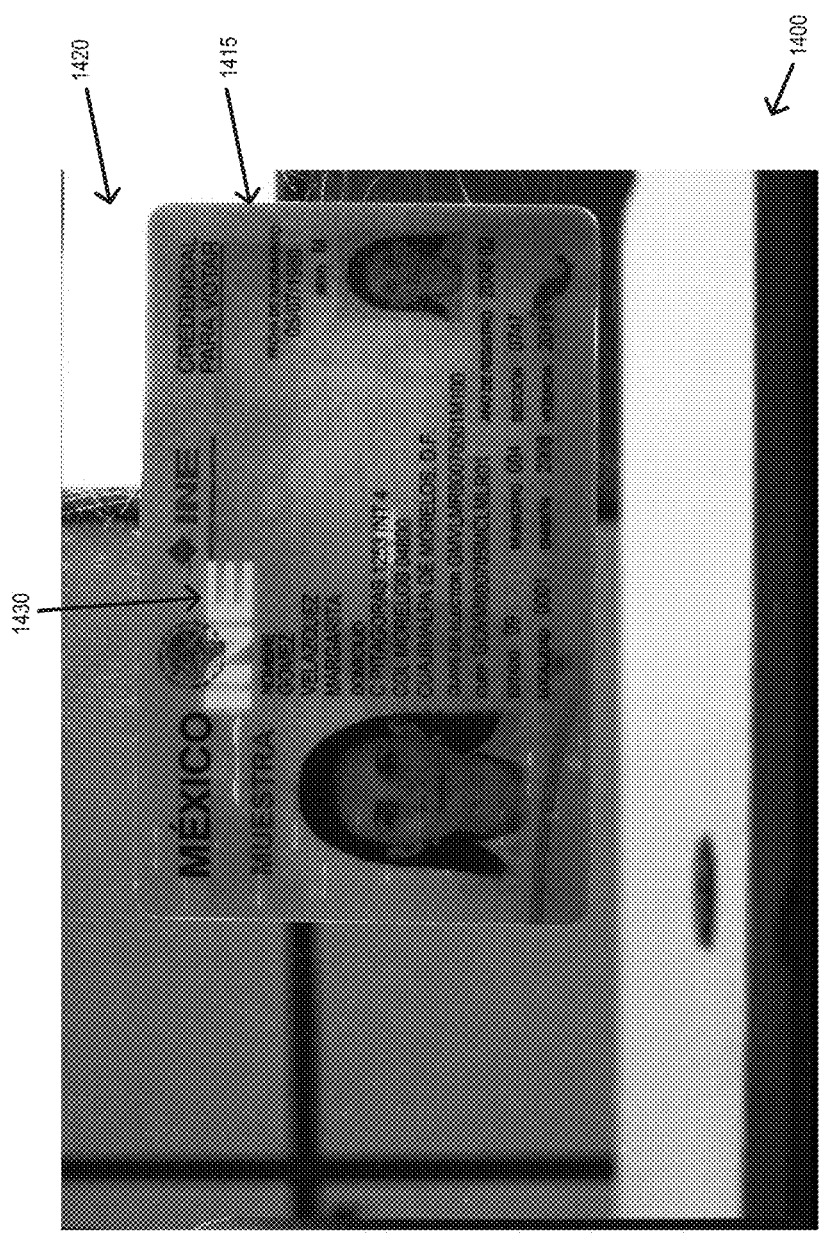
FIG. 14 shows a diagram of an example document image from the document reader of FIG. 1 with an activated light source, according to an example embodiment.

FIG. 14 shows a diagram of an example document image 1400 from the document reader 10 of FIG. 1 with an activated light source 33, according to an example embodiment. The document image 1400 generally represents a captured image from the image sensor 35 while the light source 33 is activated and includes a document 1315, as well as background objects 1420 (e.g., a ceiling light, ceiling tiles, sunlight, street lamps, etc.). In this example, the activated light source 33 is a UV light source that energizes the security features 1430, which then emit RGB light captured by the image sensor 35. Additionally, external ambient light (similar to ambient light 112) passes through the document 1415 and also around the document 1415 (e.g., through a portion of the scan area 1412 not covered by the document 1415). As shown in FIG. 14, security features, such as security feature 1430, are visible and illuminated by the activated light source 33.

Figure 15:
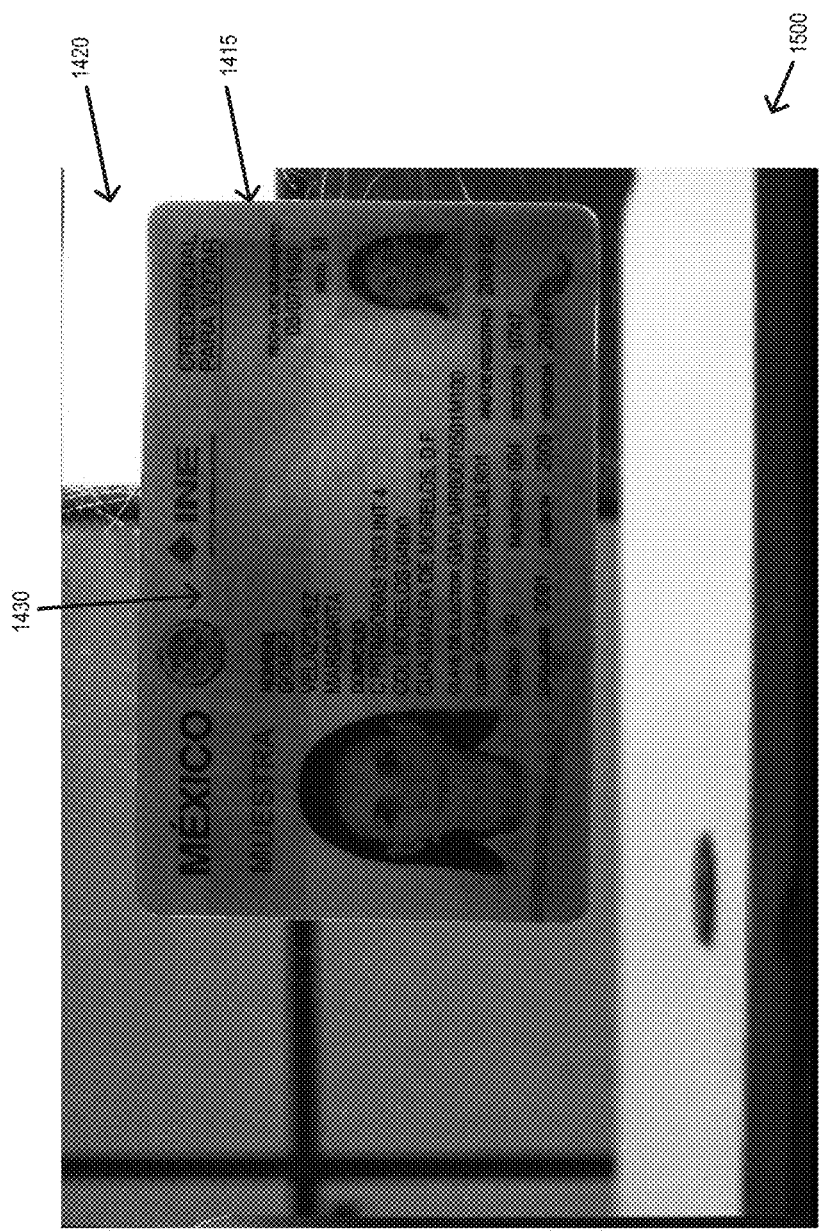
FIG. 15 shows a diagram of an example document image from the document reader of FIG. 1 with a deactivated light source, according to an example embodiment.

FIG. 15 shows a diagram of an example document image 1500 from the document reader 10 of FIG. 1 with a deactivated light source 33, according to an example embodiment. In other words, the UV light source has been deactivated. The document image 1500 provides an improved perspective of the background objects 1420.

Figure 16:
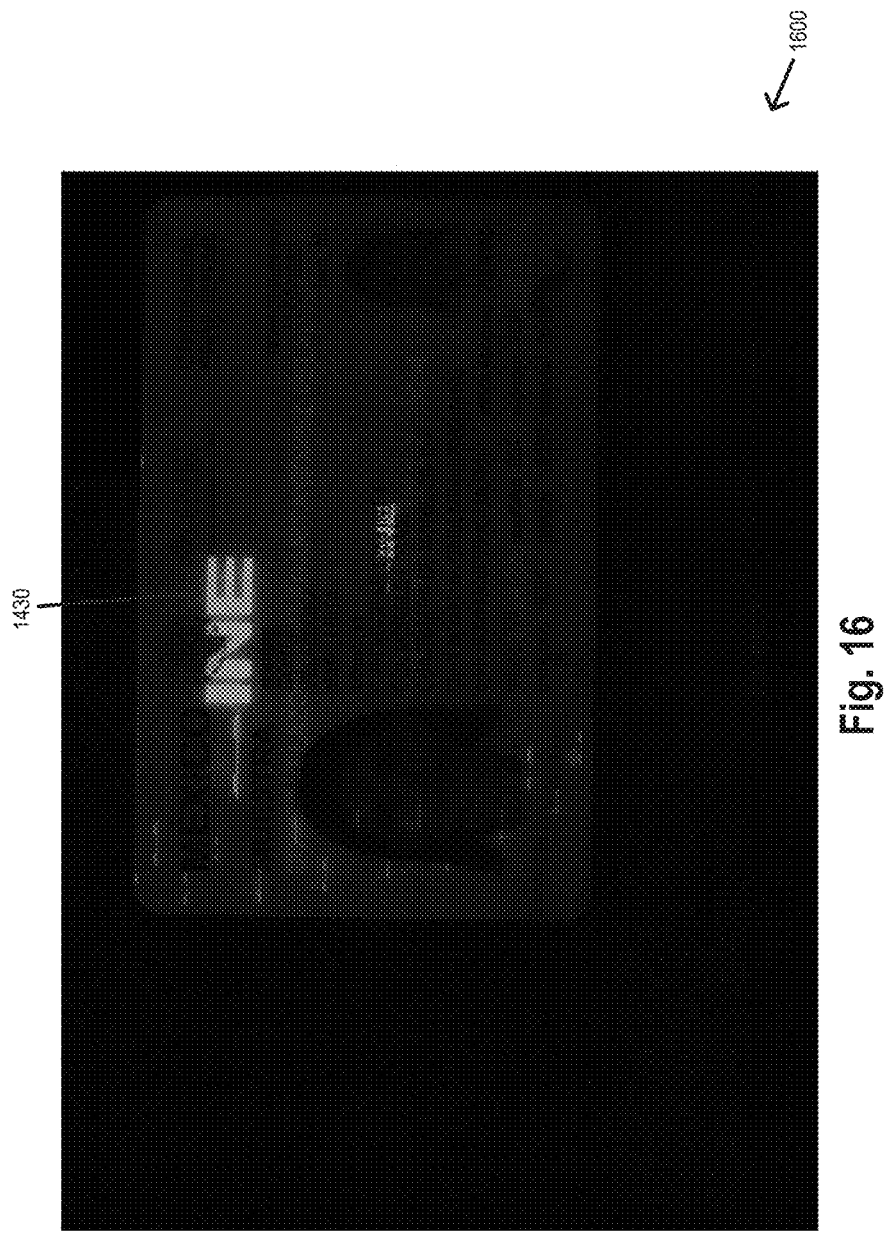
FIG. 16 shows a diagram of an example document image from the document reader of FIG. 1 after correction by an image processor, according to an example embodiment.
Figure 19A:
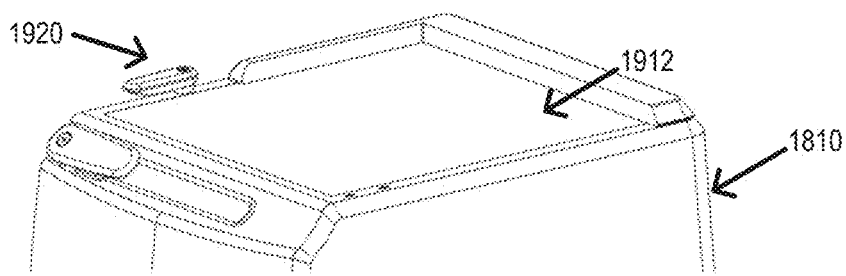
Figure 19B:
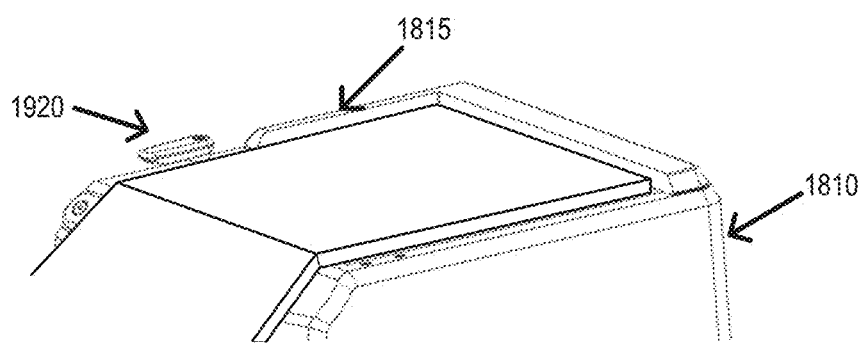
Figure 19C:
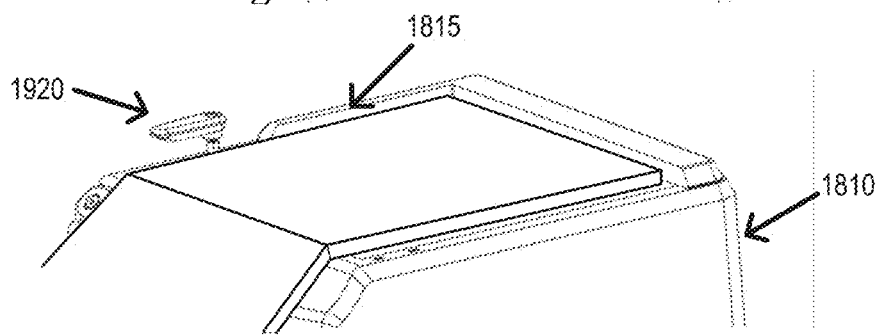
Figure 19D:
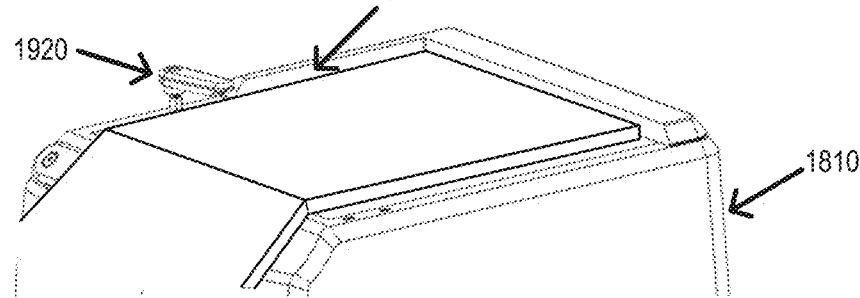
Figure 19E:
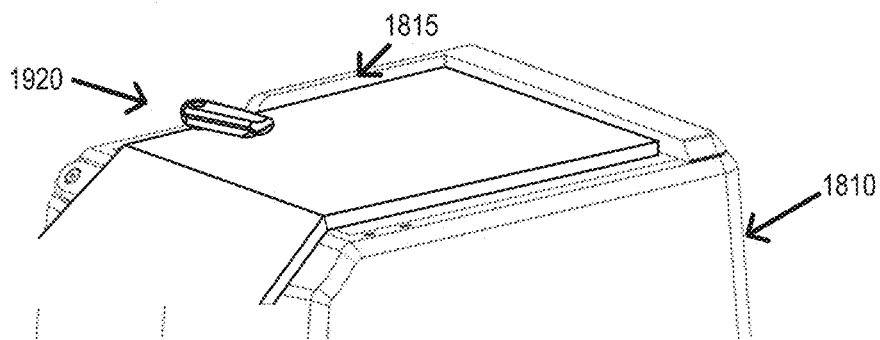

FIG. 16 shows a diagram of an example document image 1600 from the document reader 10 of FIG. 1 after correction by the processor 40, according to an example embodiment. In FIG. 16, the document 1415 is shown generally without the background objects 1420 compared to the document image 1400. Since the document image 1400 has a high dynamic range, removal of the background objects 1420 may be performed more easily, specifically, by subtracting pixel values of the document image 1500 from the corresponding pixels of the document image 1400 to obtain the document image 1600, FIG. 17A shows a diagram of an example ambient light correction 1700 without saturation, according to an example embodiment. When the document reader 10 has a hoodless configuration, ambient light may enter the image sensor 35 and interfere with a measured light intensity for the document 15. In some embodiments, the processor 40 performs an ambient light correction by causing the image sensor 35 to capture two images: a first image with IR or UV lighting and a second image with no illumination (e.g., only ambient light). In some examples, the first and second images are captured in a raw Bayer pattern format. To obtain a pixel value for an output image, each pixel of the second image (e.g., a dark pixel) is subtracted from the corresponding pixel of the first image (e.g., a light pixel). If the obtained pixel value is less than zero, the processor 40 sets the pixel value to zero. In some examples, the processor 40 only performs the ambient light correction 1700 when the processor 40 detects that the first image is not saturated.

In the example shown in FIG. 17A using an 8-bit pixel value (e.g., with a range of 0 to 255), a pixel value corresponding to the first image is 240 (the illuminated pixel with ambient light) and a pixel value corresponding to the second image is 40 (the dark pixel with ambient light). In this example, the output image has a value of 200 (240–40). The pixel value with ambient light removed generally results in the output image being almost as good as a document reader having a hood, but with slightly reduced dynamic range since the image with illumination and ambient light should not be allowed to saturate. The dynamic range is reduced by the maximum amount of ambient light expected, FIG. 17B shows a diagram of an example ambient light correction 1750 with saturation, according to an example embodiment. This example illustrates that when ambient light is too strong, the ambient light plus the light source 33 may result in a captured image with saturation. In this example, the first image is saturated and the illuminated pixel would have had a value of 265, but due to saturation is limited to 255. Ire this example, the dark value of 65 is subtracted from the saturated value of 255, which results in a pixel value of 190 instead of the correct value of 200. Accordingly, the light intensity from the light source 33 may be reduced by a maximum amount of ambient light expected, in some examples. In this example, a maximum amount of ambient illumination before the image is degraded is 55 (255–200). As long as saturation is avoided, it is possible to have high quality IR and UV images from the document reader 10 without needing to use a hood by simply subtracting a "dark" image with just ambient lighting from an illuminated image on a pixel-by-pixel basis.

Transparent Display Screens in Scan Area

In some embodiments, the scan area 12 of the document reader 10 is configured as a transparent display screen, such as a transparent liquid crystal display (LCD), transparent organic light-emitting diode display (OLED) or transparent electroluminescent display (TASEL). In these embodiments, selective portions of the transparent display screen of the scan area 12 may be activated or deactivated by the processor 40 to transition between a transparent state and an opaque or nearly opaque state. For example, one transparent LCD display utilizes transparent back light units specifically designed for transparent panels that can be activated in particular areas. When activated, the back light units provide a display that is in the opaque state in specific areas of the display screen, and the LCD blocks at least some ambient light from entering the image sensor 35. For example, the processor 40 may identify a first region of the scan area 12 that contains the document 15 and identify one or more second regions that do not contain the document 15. The processor 40 may then activate the LCD to become opaque or nearly opaque within the one or more second regions to block the ambient light from passing around the document 15 and reaching the image sensor 35. Likewise, in transparent OLED displays, the pixels that form the OLED display may be activated or deactivated to display select display areas of varying degrees of transparency and opacity. Transparent electroluminescent displays may also be implemented in conjunction with a processor to control activation of a luminescent layer, such as a phosphorous layer, to create selective areas of transparency and opacity.

Document Retention Clip

FIG. 18A, FIG. 18B, and FIG. 18C show diagrams of an example document clip 1820 of a document reader 1810, according to an embodiment. The document reader 1810 generally corresponds to the document reader 10. The document clip 1820 is configured to retain a document 1815 that has been opened to any page by holding the document 1815 under the document clip 1820, thereby displaying both pages of the document facing each other. This configuration allows for the document 1815 to be held by the document reader 1810 instead of being placed loosely on a desk or other surface by an operator of the document reader 1810, where available desk space may be limited. The document clip 1820 may include a spring (not shown) which acts as a hinge at its end to enable opening and closing of the document clip 1820. In some embodiments, the document clip 1820 is actuated to retain the document 1815 by an electromechanical device, such as a servo or other suitable device. For example, the document clip 1820 may extend away from the document reader 1810 to provide additional space for insertion of the document 1815 and then retract towards the document reader 1810 to secure the document 1815 to the document reader 1810. In some embodiments, the document clip 1820 is removable or rotatable (not shown). The spring or electromechanical device within the document clip 1820 may be configured to provide approximately 200 to 300 grams of force onto the document 1815, for example.

FIG. 19A, FIG. 19B, FIG. 19C, FIG. 19D, and FIG. 19E show diagrams of another example document clip 1920 of the document reader 1810, according to an embodiment. The document clip 1920 may be configured similarly to the document clip 1820, but instead of securing the document 1815 to an open page so that the user of the document reader 1810 may view the open page, the document clip 1920 secures the open page so that the document reader 1810 (e.g., the image sensor 35) may capture an image of the open page laid flat against a scan area 1912.

In some embodiments, the document clip 1920 is rotatable between a first position (FIG. 19A) and a second position (FIG. 19E), for example, to move clear of the scan area 1912 and allow a user to more easily place the document 1815 onto the scan area 1912. Generally, the user may simply place the document 1815 straight down onto the scan area 1912, instead of needing to press the document 1815 onto the scan area 1912 and then slide the document 1815 under the document clip 1920. In some examples, rotation of the document clip 1920 is spring loaded with detents along an axis of rotation corresponding to the first and second positions. In other examples, the document clip 1920 is an electromechanical arm (e.g., servo-activated by the processor 40) that automatically moves between the first and second positions. In some examples, the document clip 1920 also raises up (FIG. 19C) from the scan area 1912 (e.g., by 5 millimeters, 15 millimeters, or another suitable distance) to allow more clearance between the document clip 1920 and the document 1815 when the document clip 1920 rotates (FIG. 19D) from the first position to the second position. This additional clearance prevents the document clip 1920 from pushing or sliding the document 1815 out of its position. In some examples, the processor 40 automatically moves the document clip 1920 from the first position to the second position upon sensing a change in light level at the image sensor 35 when the document 1815 is placed on the scan area 1912, upon detecting a proximity of the document 1815 using a radio frequency identification circuit within the document 1815, or other suitable detection technique.

FIG. 20A, FIG. 203, and FIG. 20C show diagrams of another example document clip 2020 of a document reader 2010, according to an embodiment. The document reader 2010 may generally correspond to the document reader 10, but the document clip 2020 is actuated by a spring (not shown) and may provide approximately 200 to 300 grains of force (or other suitable value) to press the document 1815 against a scan area 2012 of the document reader 2010. Generally, a user of the document reader 2010 may slide the document 1815 under the document clip 2020 to raise the document clip 2020 against the spring. In some examples, the document clip 2020 has a beveled edge, a curved edge, or other suitable contour that facilitates sliding the document 1815 under the document clip 2020.

FIG. 21 shows a perspective cross-sectional diagram of an example document reader 2110 having a plurality of light sources 2133, according to an embodiment. The document reader 2110 is generally similar to the document reader 10 and includes a scan area 2112 (e.g., similar to scan area 12), but the plurality of light sources 2133 are arranged in different locations. For example, the document reader 2110 includes front image sources 2133A, 2133B, and 2133C that are located along a width of document reader 2110, along with at least one side light source 2133D located along a length or side of document reader 2110 and substantially perpendicular to front light sources 2133A-C, such that light sources of the document reader 2110 are positioned on at least two perpendicular sides of scan area 2112. In another embodiment, document 2110 may have multiple light sources that include front light sources 2133A-C, side light source 2133D, and a side light source (not shown) located on an opposite side of the scan area 2112 from the side light source 2133D. In this example, the side light sources each extend substantially perpendicular to front light sources 2133A-C on either side of the scan area 2112, such that light sources of the document reader 2110 are positioned on at least three sides of scan area 2112 (e.g., front, left, and right side). In other examples, the plurality of light sources 2133 may include lights on other sides or in other orientations.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A document reader system configured to capture an image of a document, the document reader system comprising:
   a document reader having:
   a transparent scan area configured to receive the document on a first side of the transparent scan area;
   a light source, positioned on a second side of the transparent scan area opposite the first side, configured to emit light towards the transparent scan area;
   an optical filter, positioned separate from the transparent scan area and between the light source and the transparent scan area, wherein the optical filter is a graduated neutral density (GND) filter and has a variable light transmission configured to modify light intensity of the light emitted by the light source, the variable light transmission of the GND filter corresponds to a filter pattern that is configured to correspond to a beam pattern of the light source; and
   an image sensor positioned on the second side of the transparent scan area and configured to capture the image of the document on the first side of the transparent scan area.

2. The document reader system of claim 1, wherein the variable light transmission of the GND filter is linear.

3. The document reader system of claim 1, wherein the light source comprises a plurality of LEDs.

4. The document reader system of claim 3, wherein the plurality of LEDs includes LEDs having different light emission spectrums.

5. The document reader system of claim 4, wherein the different light emission spectrums include two or more of an infrared (IR) spectrum, a visible light spectrum, and an ultraviolet (UV) spectrum.

6. The document reader system of claim 4, wherein the document reader comprises a plurality of optical filters, ones of the plurality of optical filters having respective filter patterns corresponding to ones of the plurality of LEDs.

7. The document reader system of claim 1, wherein the document reader comprises a light cutoff housing that restricts the light emitted by the light source.

8. The document reader system of claim 7, wherein the light cutoff housing has an aperture through which the light emitted by the light source passes before reaching the transparent scan area, the aperture being configured to restrict the light emitted by the light source to the transparent scan area.

9. The document reader system of claim 1, wherein the document reader comprises a mirror arrangement configured to reflect light from the transparent scan area into a field of view of the image sensor.

10. The document reader system of claim 1, wherein the light source is located behind a virtual image mirroring line of the mirror arrangement and the transparent scan area.

11. A method for capturing an image of a document, the method comprising:
- emitting light, by a light source, towards a second side of a transparent scan area, wherein a first side of the transparent scan area opposite the second side is configured to receive the document;
- filtering, using a graduated neutral density (GND) filter positioned separate from the transparent scan area and having a variable light transmission, the light emitted by the light source to modify light intensity of the light emitted by the light source, the variable light transmission of the GND filter corresponds to a filter pattern that is configured to correspond to a beam pattern of the light source; and
- capturing, by an image sensor positioned on the second side of the transparent scan area, the image of the document.

12. The method of claim 11, wherein a variable light transmission of the GND filter corresponds to a filter pattern that is configured to correspond to a beam pattern of the light source.

13. The method of claim 12, the method further comprising restricting the light emitted by the light source using a light cutoff housing.

* * * * *